United States Patent
Ishizaki et al.

[11] 3,919,517
[45] Nov. 11, 1975

[54] SUB-MERGED WELDING METHOD FOR HIGH TOUGHNESS WELDED METAL

[75] Inventors: Keizo Ishizaki, Tokyo; Sigeo Fujimori, Machida, both of Japan

[73] Assignee: Nippon Steel Corporation, Tokyo, Japan

[22] Filed: Apr. 2, 1973

[21] Appl. No.: 347,166

[30] Foreign Application Priority Data
Apr. 1, 1972  Japan............................. 47-32814

[52] U.S. Cl. .................. 219/73; 148/24; 219/137; 219/146
[51] Int. Cl.² ............................................. B23K 9/18
[58] Field of Search ............ 219/73, 137, 145, 146; 148/24, 26; 117/202–207; 75/123 B, 123 M

[56] References Cited
UNITED STATES PATENTS

| | | | |
|---|---|---|---|
| 3,328,212 | 6/1967 | Coless | 148/24 |
| 3,342,974 | 9/1967 | Wallner | 219/145 |
| 3,424,892 | 1/1969 | Wilcox | 219/137 |
| 3,721,797 | 3/1973 | Arikawa et al. | 148/24 |
| 3,745,294 | 7/1973 | Arikawa et al. | 219/137 |

FOREIGN PATENTS OR APPLICATIONS

| | | | |
|---|---|---|---|
| 981,354 | 1/1963 | United Kingdom | 219/73 |
| 2,063,252 | 7/1971 | France | 219/145 |

*Primary Examiner*—J. V. Truhe
*Assistant Examiner*—Clifford C. Shaw
*Attorney, Agent, or Firm*—Toren, McGeady and Stanger

[57] ABSTRACT

This invention related to a sub-merged arc welding method which comprises applying one-side or each-side one pass welding of a steel high notch toughness using a high basicity fusion-type flux containing more than 10% of $CaF_2$ and having a basicity { 0.108 CaO (%) + 0.068 MnO (%) + 0.10 MgO (%) / 0.105 $SiO_2$ (%) + 0.002 $Al_2O_3$ (%)} of 1.2 to 1.8 in combination with a welding wire comprising not more than 0.10% of carbon, not more than 0.50% of silicon, 0.8 to 2.4% of manganese, not more than 0.80% of molybdenum, 0.30 to 0.60% of titanium, less than 0.0020% of boron, with the balance being iron and unavoidable impurities to produce a weld metal with very high notch ductility.

1 Claim, 7 Drawing Figures

SUB-MERGED WELDING METHOD FOR HIGH TOUGHNESS WELDED METAL

The present invention relates to a sub-merged arc welding method for obtaining weld metal having excellent notch toughness at low temperature at the time of a high productive welding such as one-side or each-side one pass welding.

The sub-merged arc welding method has been widely adopted as a high productivity automatic welding method for steel structures, such as, ships, bridges, pressure vessels and steel pipes. This welding method has the particular feature that it yields a far higher productivity than any other welding method because it is easy to apply multi-electrode welding and high-current arc welding so that it is possible to reduce the welding pass number and to conduct a high-speed welding. In recent years, the steel grades to which the sub-merged arc welding method is applied is spreading from mild steels to high grade steel having excellent properties, such as high tensile strength, and high notch toughness. But in some applications such as a liquidified propane gas (LPG) vessels and steel structures in cold districts where the weld metal is required to have notch toughness at low temperatures, it is difficult to apply a one-side or each-side one pass welding at a high efficiency, and it is impossible to fully develop the high-productivity of the sub-merged arc welding. The reason is as follows. In general, the one-side or both-side single pass weld metal has a coarse dendritic structure in the as-welded condition, so that a proeutectoid ferrite is formed along the intergranular boundaries of the austenite grains and thus the notch toughness along the intergranular boundaries of the dendritic structure is very poor. Therefore, it is often the practice to use multi-pass welding to decompose the structure of the coarse and brittle as-welded weld metal and make it fine by means of the heat of the upper layer when toughness of the welded metal at low temperatures is required.

Therefore, it should be possible to use a highproductive sub-merged arc welding with one pass welding on one or each sides even for steel structures which notch toughness of the weld metal at low temperatures if the formation of the proeutectoid ferrite along the austenite grain boundaries of as-welded weld metal can be controlled.

Currently, for high tensile alloy steel plates, boron is used as one of the important components, to limit the formation and growth of the ferrite nuclei at the austenite grain boundaries during the cooling from high temperature. This prevents the formation of coarse ferrite grains which precipitate in a net-work pattern and which lower the notch toughness of as rolled or heat treated steel plate.

The above effects of boron can be attained by a very small amount of boron in solid solution (not more than 0.001% of sol.B), but boron is a has strong deoxidizer and strong affinity for nitrogen and easily loses its effects by combining with these elements in the steel. In order to prevent this, it is effective to include an element having an affinity for oxygen and nitrogen as strong as that of boron to prevent the boron from being oxidized and nitrized.

As for steel plate with high notch toughness, it has been common practice to use a small amount of titanium and boron after deoxidization by aluminum and a pretreatment, such as, a vacuum degassing treatment.

The present inventors have made extensive studies and experiments for improving the toughness of weld metal produced by one-side or each-side one pass welding through reproduction of similar phenomena as above in a sub-merged arc welding weld metal. It has been found by the present inventors that even a very small amount of boron is effective to improve the toughness of the weld metal by combination with a basic flux having a high $CaF_2$ content and a Ti-containing welding wire as illustrated by examples set forth hereinafter.

In general, it has been known for many years that a high basicity flux is effective to improve the toughness of weld metal in sub-merged arc welding. This is attributed to the fact that oxide inclusions which cause the lowering of the notch toughness are reduced due to the low oxygen potential of the welding flux. This basic flux, in combination with a Ti-containing wire, causes the oxygen and nitrogen remaining in the welded metal to form titanium compounds and makes them stable so that even the very small amount of boron in the welded metal remains as effective solid solution boron (sol.B) which prevents the formation of the proeutectoid ferrite along the austenite grain boundaries. Thus weld metal having very excellent notch toughness can be obtained. When the high basicity flux and the Ti-containing wire are used in combination, even a very small amount of boron which is naturally present in the flux may sometime show the above effects. The improvement of toughness by the titanium content in a Ni-Mo-Ti- wire as disclosed in Japanese Pat. Publication No. Sho 47-3002 is interpreted to be based on the above fact.

Japanese Pat. Publication No. Sho 46-9403 discloses an improvement of toughness in the weld metal with addition of boron by the combination of Boron from two sources, i.e., a wire, a flux and additives, and specifies a very high boron content of 0.001 – 0.015%. This high boron content is presumably due to the fact that most of boron added from a single source combines with oxygen or nitrogen and is present as inert boron.

According to the present invention, a high basicity fusion-type flux having a basidity (B) of 1.2 – 1.8 and containing more than 10% of $CaF_2$ and a welding wire comprising less than 0.10% of carbon, less than 0.50% of silicon, 1.0 – 2.4% of manganese, less than 0.80% of molybdenum, 0.30 – 0.60% of titanium and less than 0.0020% of B are used in combination to maintain the oxygen and nitrogen in the weld metal in a stable form. Thus a very high toughness weld metal comprising less than 0.10% of carbon, less than 0.50% of silicon, less than 2.0% of manganese, less than 0.40% of molybdenum, 0.010 – 0.040% of sol.titanium and 0.0001 – 0.0008% of sol.B can be obtained in one-side or each-side one pass sub-merged arc welding.

The features of the present invention will be described in more details referring to the attached drawings.

I. Combination use of a basic flux and a Ti-containing wire

It is necessary to keep the oxygen content remaining in the weld metal as low as possible and to prevent oxidation of boron in order to prevent the formation of the proeutectoid ferrite along the austenite grain boundaries through activation of a very small amount of boron in the weld metal.

Figure 1:
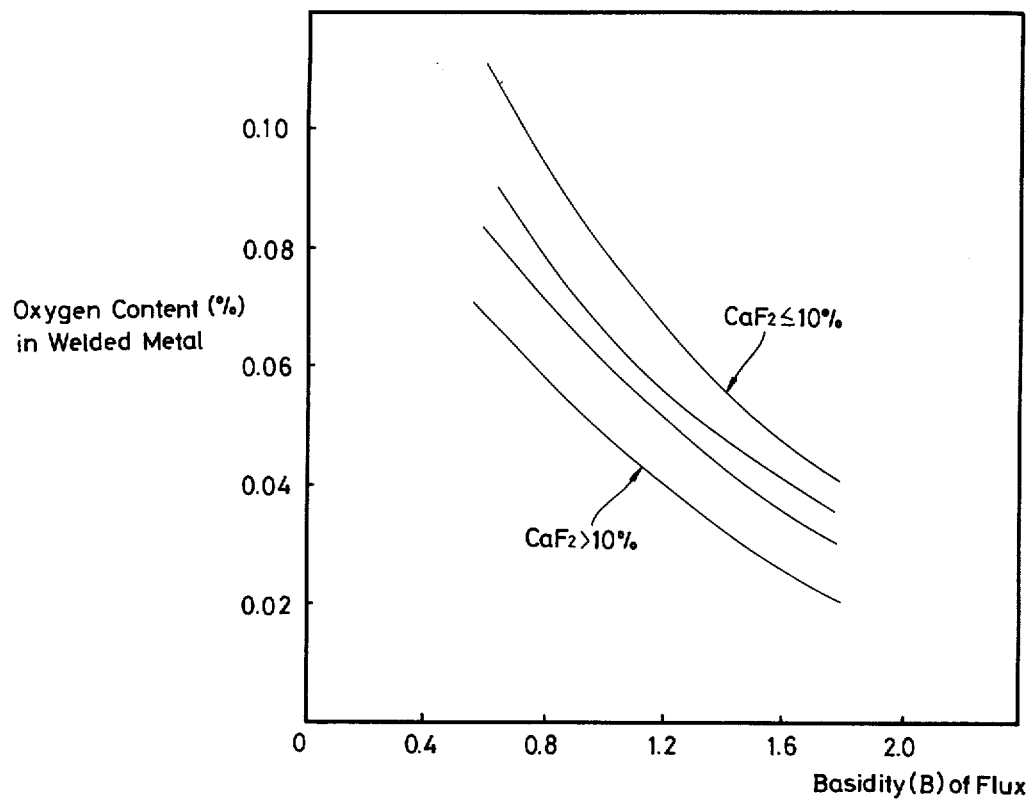
FIG. 1 is a graph showing the relation between the flux basicity (B) and the oxygen content in the weld metal.

It has been generally understood that the oxygen content in the sub-merged arc weld metal depends on the flux composition, and it has been well known that when the basic components such as CaO and MgO of the flux are increased and the acidic components such as $SiO_2$ and $TiO_2$ are decreased, the oxygen content in the weld metal decreases. FIG. 1 shows the relation between the basicity of the flux and the oxygen content in the weld metal in the case of a each-side one pass welding applied to a 60 kg/m² class high grade line pipe steel plate, and a definite relation is observed between the following basicity formula introduced by J. Zeke and the oxygen content in the weld metal.

$$\text{Basicity (B)} = \frac{0.108\, CaO(\%) + 0.068\, MnO(\%) + 0.10\, MgO(\%)}{0.105\, SiO_2(\%) + 0.002\, Al_2O_3(\%)} \quad (\text{weight } \%)$$

The relation shown in FIG. 1 is for the following flux composition range.

| | |
|---|---|
| $SiO_2$ 20 – 45%, | MnO 0.2 – 45%, CaO 0.5 – 30%, |
| MgO 0.5 – 30%, | $Al_2O_3$ 1.5 – 15%, $TiO_2$ 0.1 – 20%, |
| $CaF_2$ 3 – 25%, | $Na_2O + K_2O + BaO$ 0.5 – 3%, |
| FeO 0.4 – 3%, | Balance: unavoidable impurities. |

Within the above flux composition range, a flux containing less than 10% of $CaF_2$ shows a basicity (B) more than 1.5, a flux containing more than 10% of $CaF_2$ shows a basicity (B) more than 1.2, and in case of fluxes within the above range, the oxygen content in the weld metal is not more than 0.05%, and no formation of coarse ferrite along the austenite grain boundaries is observed even when the boron content in the weld metal is not more than 0.0010% when the welding is done using a Ti-containing welding wire in combination.

On the other hand, when the flux basicity is below the above range and the oxygen content in the weld metal is more than 0.05 – 0.06%, a coarse proeutectoid ferrite is formed along the austenite grain boundaries even when the boron content is more than 0.0010% and thus it is understood the boron content does not act effectively in this case.

Thus, in order to develop the effect of the boron content even when the boron content in the weld metal is very small, e.g., less than 0.0010%, it is necessary to maintain the basicity of the flux used in the sub-merged arc welding above a certain value. But increase of the basicity only deteriorates the welding operation feasibility, particularly the high-speed weldability, and when the basicity (B) is above 1.8, the welding can not be applied to production of steel pipes, such as, high-grade line pipes. In this point, a flux containing more than 10% of $CaF_2$ has an advantage that the oxygen content can be lowered without sacrificing the welding operation feasibility.

II. Welding wire and Ti content

Each-side single pass sub-merged arc weldings were applied to the 60 kg/mm² class high grade line pipe steel plate using a flux having a basicity (B) more than 1.2 and containing 18% of $CaF_2$ in combination with various welding wires containing titanium ranging from 0.05% to 0.7%, and it has been found that the proper titanium content in the wire is 0.30 – 0.60%.

In case of one-side or each-side one pass welding, the melting ratio of the welding wire to the weld meal is about 1/3, and about ½ of the titanium content in the wire is consumed in the arc by oxidation, etc. About ½ of the titanium content transfers into the weld metal so that about 1/6 of the titanium content in the wire goes into the welded metal. Therefore, the proper titanium content of 0.30 – 0.60% in the wire will be 0.05 – 0.10% in the weld metal.

In case of a sub-merged welding with a flux having a basicity (B) of 1.2 – 1.8, the oxygen and nitrogen contents in the welded metal are 0.03 – 0.05% and 0.004 – 0.008% respectively according to analysis results, and in order to make these oxygen and nitrogen into a stable form as titanium compounds, titanium must be present in an amount corresponding to the oxygen and nitrogen remaining in the weld metal.

Table 1 shows the relation among the oxygen, nitrogen and titanium contents in the weld metal when various fluxes and welding wires are used in combination, and it is seen from the table that most of the oxygen content and about ½ of the nitrogen content are converted into $TiO_2$ and TiN respectively due to the strong affinity of titanium with oxygen and nitrogen. In order to confirm whether the oxygen and nitrogen in the welded metal are in a stable form, it is sufficient to conduct quantitive analysis of sol.Ti. According to the results of Table 1 it is understood that a glass-like flux having higher basicity and larger density gives a higher content of sol.Ti even when the titanium content in the wires the same so that a titanium content of 0.30% in the wire is enough. But on the other hand, the case of a pumice-like flux having a low basicity, since the oxygen and nitrogen contents are higher, it is necessary to increase the titanium content in the wire considerably.

According to observation of the micro structures of the weld metal and the results of 2 mm notched Charpy impact tests, boron in a very small amount is effective at a titanium content more of than 0.010% as sol.Ti in the weld metal. However, when the sol.Ti content is more than 0.04%, rapid embrittlement takes place. Thus, the proper sol.Ti range in the weld metal is 0.010 – 0.040%.

Thus, when the titanium content in the wire is less than 0.30%, deoxidization and removal of nitrogen is not enough even when a flux which gives the lowest oxygen and nitrogen contents in the weld metal is used in combination so that the very small amount of boron becomes inert and thus the formation of the proeutectoid ferrite along the austenite grain boundaries can not be prevented effectively. On the other hand, when the titanium content in the wire is more than 0.60%, the sol.Ti content tends to be more than 0.40% even when a flux which gives the highest oxygen and nitrogen contents in the weld metal is used, so that solid solution Ti which is easily oxidized and nitrized increases and the notch toughness of the weld metal decreases sharply and at the same time the hardness increases abnormally. Moreover, a wire containing more than 0.60% of titanium is impossible to produce economically.

Table 1

Analysis of Weld Metals obtained by
Using Various Fluxes and Ti-Containing Wires.

| Fluxes | | | Ti-content in Wires | Chemical Analysis of Weld Metal | | | | |
|---|---|---|---|---|---|---|---|---|
| CaF$_2$ contents | Basicity (B) | Forms | | O | N | sol.Ti | insol.Ti as TiO$_2$ | insol.Ti as TiN |
| | | | | % | % | % | % | % |
| 17 | 1.20 | pumice-like | 0.48 | 0.050 | 0.0082 | 0.006 | 0.062 | 0.013 |
| '' | '' | '' | 0.60 | 0.049 | 0.0078 | 0.033 | 0.065 | 0.014 |
| '' | '' | glass-like | 0.48 | 0.050 | 0.0040 | 0.008 | 0.066 | 0.007 |
| 20 | 1.52 | '' | '' | 0.040 | 0.0062 | 0.020 | 0.052 | 0.010 |
| 10 | 1.78 | pumice-like | '' | 0.033 | 0.0085 | 0.030 | 0.042 | 0.015 |
| '' | '' | glass-like | '' | 0.027 | 0.0043 | 0.040 | 0.034 | 0.008 |
| '' | '' | '' | 0.30 | 0.026 | 0.0041 | 0.012 | 0.033 | 0.006 |

As the conclusion, the proper titanium range by weight percent of sol.Ti in the weld metal is from 0.01% which is required to prevent the very small amount of boron from oxidization and nitrization to 0.04% which is the limit for preventing the embrittlement of the welded metal due to the abnormally high solid solution Ti content. Also the proper titanium range in the welding wire is from 0.30% to 0.60%.

III. Proper Boron range in weld metal

Figure 2:
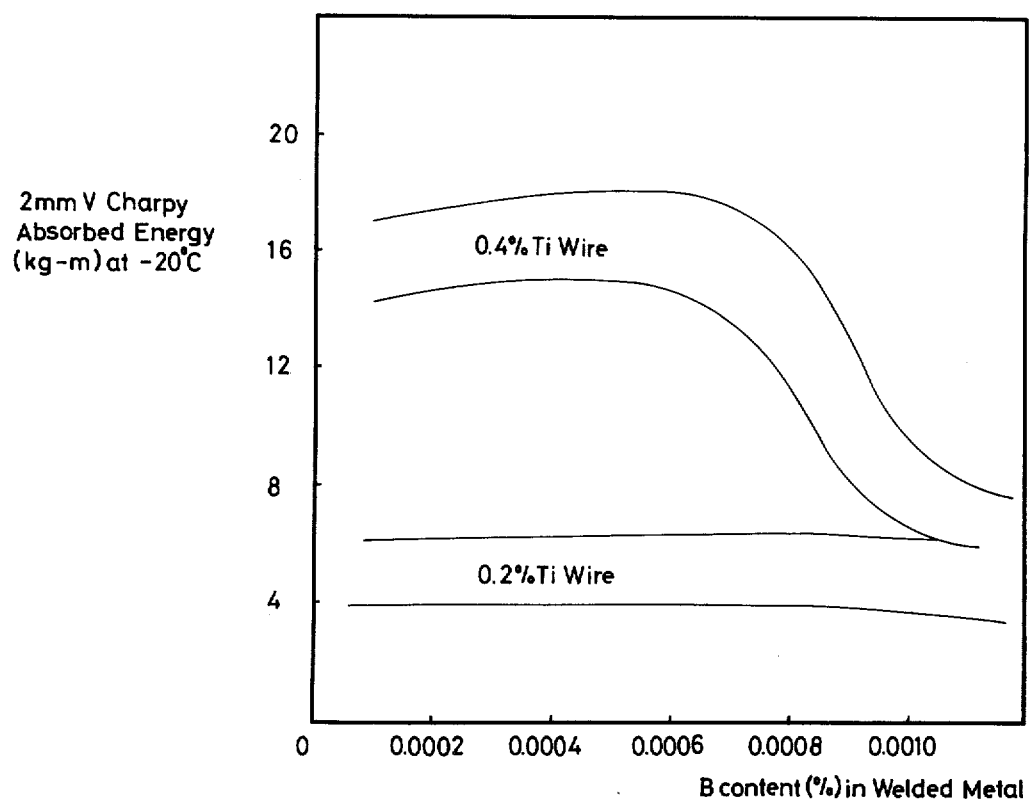
FIG. 2 is a graph showing the relation between the boron content in the welded metal and impact value.

Each-side one pass sub-merged arc weldings were applied to the 60 kg/mm$^2$ class high grade pipe line steel plates using high CaF$_2$ fluxes having a basicity of more than 1.2 and welding wires containing 0.4% Ti in combination, and the relation between the boron content in the weld metal and the notch toughness was examined. The results are shown in FIG. 2. In this case, the weld metal is fully deoxidized and denitrified, the most of the boron content in the weld metal is in the form of solid solution B (sol.B) and the insol.B is less than 0.0001% in all cases.

When the same flux as is stated above and a welding wire containing 0.2% Ti are used in combination, the deoxidization and nitrogen removal from the weld memtal is not enough, the resulting in increased insol.B content.

As clearly understood from the results shown in FIG. 2, in case of a welded metal which is satisfactorily deoxidized and denitrified by the combined use of a basic flux and a welding wire containing a proper amount of titanium, very high notch toughness can be obtained even by a very small amount of boron as about 0.0008%. It is particularly noticeable that the boron effects are shown even at a boron content of about 0.0002% and the notch toughness lowers at a boron content of more than 0.0010%. This is understood to mean that the sol.B is absorbed to the austenite grain boundaries and is present in non-uniformities, so that even an amount of boron as small as about 0.0002% can satisfactorily prevent the formation of proeutectoid ferrite along the austenite grain boundaries. Therefore, in case of a boron content of more than 0.0010%, boron is excessive along the austenite grain boundaries so that it is considered that the restricting effect against the proeutectoid ferrite is hindered and boron compounds which deteriorate the notch toughness at the grain boundary are formed. On the other hand, in case of the welding wire containing 0.2% Ti which gives unsatisfactory deoxidization and nitrogen removal of the weld metal, the formation of the proeutectoid ferrite along the austenite grain boundaries takes place, and no improvement of notch toughness is observed as shown in the drawings.

The above results are those obtained by the welding wire containing a proper titanium amount of 0.4%, and the wire containing an inadequate titanium amount of 0.2%, corresponding to 0.02% and 0.005% respectively expressed as sol.Ti in the weld metal.

Figure 3:
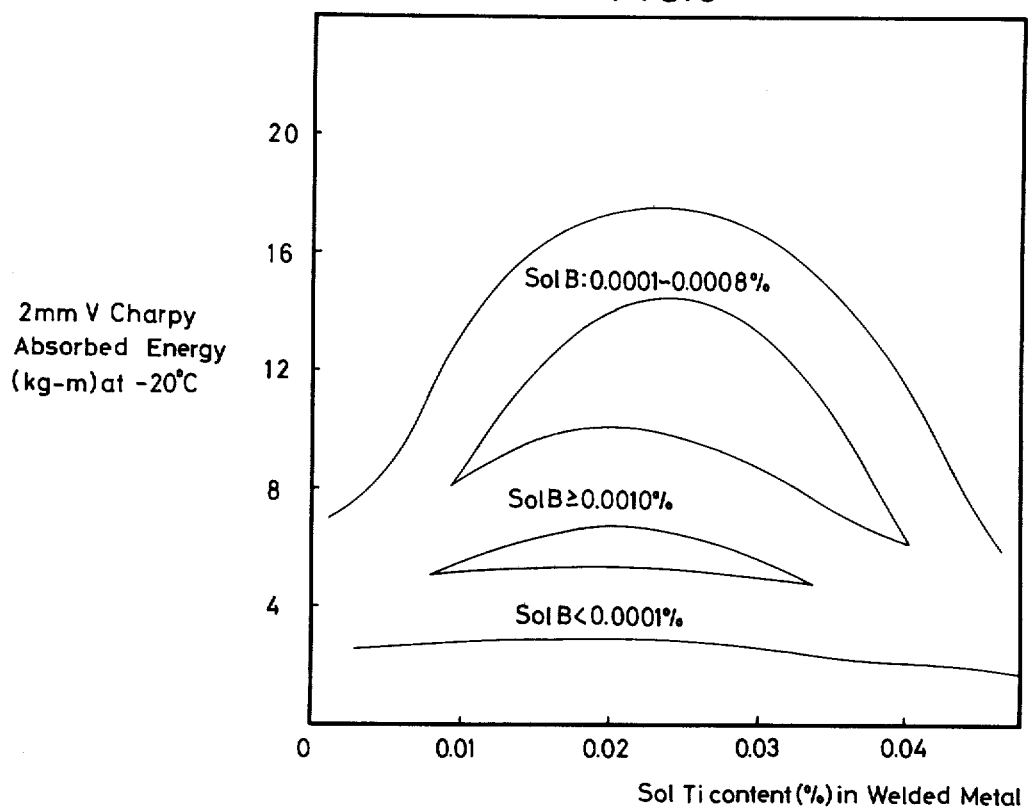
FIG. 3 is a graph showing the relation between the sol.Ti and sol.B contents and impact value.

As above, the effects of boron are remarkably affected by the titanium content in the welding wire, hence by the sol.Ti in weld metal, and these phenomena can be summarized as in FIG. 3. Therefore, in order to improve the notch toughness of the weld metal as high as possible, the sol.Ti may be contained in a range of 0.010% to 0.040%, or the sol.B may be contained in a range of 0.0001% to 0.0008%.

For obtaining such a weld metal, a high basicity flux and a welding wire containing 0.30 – 0.60% Ti may be used in combination. In this case the boron content in the weld metal is added from a boron source as an unavoidable impurity contained in the steel plates as well as the flux. For this reason, the B$_2$O$_3$ content in the flux and boron content in the steel plates should be controlled. However, since these boron sources have not been added intentionally in some cases there may be almost no boron, and in most cases the boron coming into the weld metal an unavoidable impurity is less than 0.0006% as sol.B. Therefore, it is necessary to control the sol.B in the weld metal coming from the addition of very small amount of boron in the wire between 0.0001 and 0.0008%. It has been found from our experiments that the above shortage of boron can be fully made up when the boron content in the wire is maintained at less than 0.0020% as clearly shown by the examples set forth hereinafter.

IV. Proper ranges of elements other than Ti and B

Besides Ti and B, Si, Mn and Mo have important roles for improving the toughness of the weld metal respectively and have their appropriate ranges. The reasons for limiting the ranges of these elements as defined before are as follows.

When the carbon content is more than 0.10%, the notch toughness at low temperatures is deteriorated and the hardness and crack-sensitivity of the weld metal are remarkably increased. Therefore, the upper limit of carbon content both in the weld metal and the welding wire is set at 0.10%.

Silicon is a ferrite forming element and tends to remain as oxide inclusion in the weld metal, and more than 0.50% of silicon in the weld metal causes the lowering of the notch toughness. Therefore, it is necessary to restrict the silicon content in the welding wire as low as possible, but the high titanium content as 0.30 - 0.60% makes it difficult to maintain the silicon content from the steel making requisite, and thus the silicon is limited to not more than 0.50% both in the wire and the weld metal.

Both of Mn and Mo inprove the structure of the weld metal matrix and are necessary for maintaining the strength and toughness. Mn, in particular, is necessary to be present more than 1.0% in the weld metal, and with a manganese content less than 1.0%, the hardenability is lost and the very small amount of boron does not work effectively.

On the other hand, a manganese content more than 2.0% is not desirable because the weld metal has a brittle upper bainite structure. In order to maintain the manganese content in the range of 1.0 to 2.0% in the weld metal, the manganese content in the welding wire may be controlled between 0.8 and 2.4%. The reason for the difference between the range in the weld metal and the welding wire is due to the influence of flux as well as the dilution of weld metal by the base materials especially in case of the one pass welding.

A molybdenum content up to 0.40% in the weld metal is effective for improving the hardenability and the structure and useful for assuring the strength and the toughness. However, as for the molybdenum content of more than 0.40%, the hardness becomes abnormally high and the toughness lowers. In order to maintain the molybdenum content not more than 0.40% in the weld metal it is necessary to maintain the molybdenum content in the welding wire at not more than 0.80% in view of the dilution of the weld metal by the base material.

The present invention will be more clearly understood from the following examples.

EXAMPLE 1

Figure 4:
FIGS. 4 and 7 show edge preparations and the portions of welded metals from which impact testing pieces are taken.

A each-side one pass sub-merged arc welding was applied to a 60 kg/mm$^2$ class high grade line pipe steel sheet of 16 mm thickness using a welding wire shown in Table 3 and a basic fusion-type flux shown in Table 2 in the edge preparation as shown in FIG. 4.

Figure 5:

Welding conditions.
Distance between two electrodes: 18 mm
The leading electrode for back-side welding pass: 1050A; 34V
The trailing electrode: 850A; 38 V
The leading electrode for finishing welding pass: 1250A; 35V
The trailing electrode: 850A; 40V
The welding speed: 135 cm/min. for both sides After the welding, a 2 mm V-notched Charpy test piece as shown in FIG. 5 was taken from the thickness center of the center portion of the weld metal, and subjected to impact testing. The results of the test are shown in Table 4 together with the chemical compositions of the weld metals. All of the weld metals show results satisfying the impact value standard of a high-pressure gas line pipe to be used in cold districts.

What is of interest here is that even when the wire WA containing no boron is used, 0.0005 - 0.0003% of boron is present in the welded metal, this fact proves that there is a boron source in a very small amount as unavoidable impurity in the flux and the steel plate, and even if no boron is added intentionally in the welding materials and the steel plate, it is unavoidable to prevent such a very small amount of boron from coming into the weld metal. And in the ordinary welding method, the boron is converted into inert boron by oxygen and nitrogen in the air and no improvement effect of the structure of the weld metal is obtained. But the combination use of a high basicity flux and a Ti-containing wire make the boron active and effective for the improvement of the weld metal structure even when boron is present in a very small amount.

Table 2

Compositions of Fluxes

| Flux Designation<br>Composition | F 1 | F 2 | F 3 | F 4 |
|---|---|---|---|---|
| | % | % | % | % |
| SiO$_2$ | 32 | 30 | 28 | 24 |
| MnO | 12 | 8 | 6 | 2 |
| CaO | 16 | 28 | 32 | 26 |
| MgO | 15 | 5 | 10 | 15 |
| Al$_2$O$_3$ | 4 | 10 | 10 | 12 |
| TiO$_2$ | 4 | 4 | 3 | 2 |
| CaF$_2$ | 17 | 15 | 11 | 20 |
| Basicity (B) | 1.20 | 1.31 | 1.65 | 1.76 |

Table 3

Compositions of Welding Wires

| Wire Designation<br>Composition | WA | WB |
|---|---|---|
| | % | % |
| C | 0.08 | 0.08 |
| Si | 0.05 | 0.10 |
| Mn | 1.95 | 1.70 |
| P | 0.008 | 0.009 |
| S | 0.006 | 0.006 |
| Mo | 0.45 | 0.50 |
| Ti | 0.50 | 0.45 |
| B | <0.0003 | 0.0015 |

Table 4

| | | Chemical Composition of Weld Metals and Impact Values | | | | | |
|---|---|---|---|---|---|---|---|
| Flux and Wire | | F1×WA<br>% | F2×WA<br>% | F1×WB<br>% | F2×WB<br>% | F3×WB<br>% | F4×WB<br>% |
| Chemical | C | 0.07 | 0.08 | 0.07 | 0.07 | 0.08 | 0.08 |
| Compositions | Si | 0.30 | 0.29 | 0.31 | 0.28 | 0.24 | 0.22 |
| of Weld | Mn | 1.72 | 1.78 | 1.65 | 1.71 | 1.88 | 1.82 |
| Metals | P | 0.015 | 0.014 | 0.016 | 0.016 | 0.015 | 0.016 |
| | S | 0.007 | 0.006 | 0.007 | 0.006 | 0.006 | 0.005 |
| | Mo | 0.15 | 0.13 | 0.18 | 0.14 | 0.16 | 0.17 |
| | sol.Ti | 0.02 | 0.02 | 0.03 | 0.02 | 0.02 | 0.03 |
| | sol.B | 0.0005 | 0.0003 | 0.0008 | 0.0006 | 0.0005 | 0.0006 |
| | O | 0.041 | 0.038 | 0.040 | 0.039 | 0.031 | 0.028 |
| 2mm V notched Charpy Impact | | 15.2 | 14.8 | 11.7 | 17.5 | 18.2 | 17.9 |

Table 4-continued

| Flux and Wire | Chemical Composition of Weld Metals and Impact Values | | | | | |
|---|---|---|---|---|---|---|
| | F1×WA % | F2×WA % | F1×WB % | F2×WB % | F3×WB % | F4×WB % |
| Value at −20°C (kg-m) | | | | | | |

EXAMPLE 2

Figure 6:
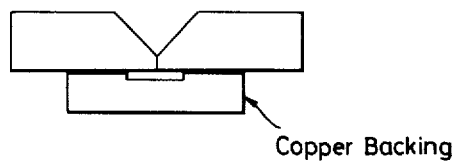

A one-side one pass sub-merged arc welding was applied to a 50 kg/mm² class high toughness steel plate of 19 mm thickness with a copper plate backing, using welding wires shown in Table 6 and basic fusion-type fluxes shown in Table 5 with an edge preparation shown in FIG. 6.

Welding conditions:
Distance between electrodes (three):
20 mm between the leading electrode and the intermediate electrode;
25 mm between the intermediate electrode and the trailing electrode;
The leading electrode: 1100A; 33V
The intermediate electrode: 900A; 38V
The trailing electrode: 800A; 42V
The welding speed: 1 m/min.

Figure 7:
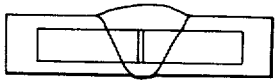

After the welding, 2 mm V-notched Charpy test pieces were taken from the center portions of the weld metals as shown in FIG. 7 and were subjected to impact testing. The results are shown in Table 7 together with the chemical compositions of the weld metals. The results fully satisfy the impact value standard for steel structures to be used in cold districts.

Although no boron was added intentionally to the fluxes and the wires, 0.0006% of boron was observed in the welded metal just as in Example 1. This is considered to be due to the unavoidable boron remaining in the steel plate and the fluxes, and for confirmation, the analysis was made for $B_2O_3$ in the fluxes, and it was found that 0.009% of boron was present in the fluxes as shown in Table 4. Thus, even when no boron is added intentionally in the fluxes, a very small amount of boron is present as an unavoidable impurity in the natural ores, and particularly it is known that a considerable amount of boron is present in MgO materials.

As clearly understood from the above examples, the notch toughness can be improved by even a very small amount of boron when a high-basicity fusion-type flux and a Ti-containing welding wire are used in combination. Thus the present invention is very useful for improving the toughness of the weld metal of a high efficiency one-side or each-side one pass sub-merged arc welding at low cost.

Table 5

| Composition of Flux | |
|---|---|
| Flux Designation Composition | F 3 |
| $SiO_2$ | 30 % |
| MnO | 10 |

Table 5-continued

| Composition of Flux | |
|---|---|
| Flux Designation Composition | F 3 |
| CaO | 15 |
| MgO | 16 |
| $Al_2O_3$ | 6 |
| $TiO_2$ | 3 |
| $CaF_2$ | 19 |
| $(B_2O_3)$ | 0.009 |
| Basicity | 1.24 |

Table 6

| Composition of Welding Wire | |
|---|---|
| Wire Designation Composition | WD |
| C | 0.10% |
| Si | 0.30 |
| Mn | 2.20 |
| P | 0.010 |
| S | 0.008 |
| Mo | 0.30 |
| Ti | 0.41 |
| B | < 0.0003 |

Table 7

| Chemical Composition of Weld Metal and Impact Value Combination of Flux and Wire | | |
|---|---|---|
| | | F3 × WD |
| Chemical Composition of Weld Metal | C | 0.10 % |
| | Si | 0.45 |
| | Mn | 1.88 |
| | P | 0.015 |
| | S | 0.009 |
| | Mo | 0.10 |
| | sol.Ti | 0.02 |
| | sol.B | 0.0006 |
| | O | 0.035 |
| 2mm V notched Charpy impact value at −20°C (kg-m) | | 9.2 |

What is claimed is:

1. A sub-merged arc welding method which comprises applying one-side or each-side pass welding of a high grade line pipe steel with high notch toughness using a high basicity fusion-type flux containing more than 10% of $CaF_2$ and having a basicity determined by the formula: 0.108 CaO (%) + 0.068 MnO (%) + 0.10 MgO (%) / 0.105 $SiO_2$ (%) + 0.002 $Al_2O_3$ (%) of 1.2 to 1.8, in combination with a welding wire consisting essentially of not more than 0.10% of carbon, not more than 0.50% of silicon, 0.8 to 2.4% of manganese, not more than 0.80% of molybdenum, 0.30 to 0.60% of titanium, and less than 0.0020% of boron, with the balance being iron and unavoidable impurities to produce a weld metal with very high notch toughness.

* * * * *